US 8,814,401 B2

(12) United States Patent
Higgins-Luthman et al.

(10) Patent No.: US 8,814,401 B2
(45) Date of Patent: *Aug. 26, 2014

(54) VEHICULAR VISION SYSTEM

(75) Inventors: Michael J. Higgins-Luthman, Livonia, MI (US); Yuesheng Lu, Farmington Hills, MI (US); William C. Ince, Novi, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/427,166

(22) Filed: Mar. 22, 2012

(65) Prior Publication Data

US 2012/0182425 A1 Jul. 19, 2012

Related U.S. Application Data

(63) Continuation of application No. 13/292,120, filed on Nov. 9, 2011, now Pat. No. 8,142,059, which is a continuation of application No. 13/074,698, filed on Mar. 29, 2011, now Pat. No. 8,070,332, which is a continuation of application No. 12/171,436, filed on Jul. 11, 2008, now Pat. No. 7,914,187.

(60) Provisional application No. 60/949,352, filed on Jul. 12, 2007.

(51) Int. Cl.
*F21V 21/28* (2006.01)
*G06K 9/00* (2006.01)
*B60Q 1/24* (2006.01)
*B60Q 1/08* (2006.01)

(52) U.S. Cl.
CPC ............ *B60Q 1/085* (2013.01); *B60Q 1/245* (2013.01); *B60Q 2300/23* (2013.01); *B60Q 2300/45* (2013.01)

USPC ........................ 362/465; 362/466; 382/104

(58) Field of Classification Search
USPC ................ 362/465, 466, 100, 103, 104, 117; 392/100, 103, 104, 117
See application file for complete search history.

(56) References Cited

U.S. PATENT DOCUMENTS 2,632,040 A   3/1953   Rabinow
2,827,594 A   3/1958   Rabinow (Continued)

FOREIGN PATENT DOCUMENTS

EP   0426503   5/1991
EP   0492591   7/1992

(Continued)

OTHER PUBLICATIONS

G. Wang, D. Renshaw, P.B. Denyer and M, Lu, CMOS Video Cameras, article, 1991, 4 pages, University of Edinburgh, UK.

(Continued)

*Primary Examiner* — John A Ward
(74) *Attorney, Agent, or Firm* — Gardner, Linn, Burkhart & Flory, LLP

(57) ABSTRACT

A vehicular vision system includes an imaging device and a control operable to process image data captured by the imaging device. The control is operable to process the captured image data to detect at least one of (i) a sign ahead of the equipped vehicle, (ii) an animal ahead of the equipped vehicle and (iii) a pedestrian ahead of the equipped vehicle. The control is operable to process the captured image data to detect an oncoming headlight or a leading taillight of another vehicle ahead of the equipped vehicle. An illumination source is operable to illuminate generally forwardly and/or generally sidewardly of the equipped vehicle, and wherein illumination emanating from the illumination source is adjustable.

68 Claims, 3 Drawing Sheets

(56) References Cited

U.S. PATENT DOCUMENTS

| | | |
|---|---|---|
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek et al. |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |

(56) References Cited

U.S. PATENT DOCUMENTS

| | | |
|---|---|---|
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |

(56) References Cited

U.S. PATENT DOCUMENTS

| | | |
|---|---|---|
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,149,613 B2 | 12/2006 | Stam et al. |
| 7,167,796 B2 | 1/2007 | Taylor et al. |
| 7,202,776 B2 | 4/2007 | Breed |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,339,149 B1 | 3/2008 | Schofield et al. |
| 7,344,261 B2 | 3/2008 | Schofield et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,425,076 B2 | 9/2008 | Schofield et al. |
| 7,432,248 B2 | 10/2008 | Roberts et al. |
| 7,459,664 B2 | 12/2008 | Schofield et al. |
| 7,510,310 B2 | 3/2009 | Komatsu |
| 7,526,103 B2 | 4/2009 | Schofield et al. |
| 7,561,181 B2 | 7/2009 | Schofield et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,720,580 B2 | 5/2010 | Higgins-Luthman |
| 7,914,187 B2 * | 3/2011 | Higgins-Luthman et al. ............ 362/465 |
| 8,070,332 B2 * | 12/2011 | Higgins-Luthman et al. ............ 362/465 |
| 8,142,059 B2 * | 3/2012 | Higgins-Luthman et al. ............ 362/465 |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Widmann et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0180529 A1 | 7/2008 | Taylor et al. |
| 2008/0205072 A1 | 8/2008 | Chretien |
| 2009/0113509 A1 | 4/2009 | Tseng et al. |
| 2010/0045797 A1 | 2/2010 | Schofield et al. |

FOREIGN PATENT DOCUMENTS

| | | |
|---|---|---|
| EP | 0788947 | 8/1997 |
| FR | 2641237 | 7/1990 |
| JP | 59114139 | 7/1984 |
| JP | 6079889 | 5/1985 |
| JP | 6080953 | 5/1985 |
| JP | 6272245 | 5/1987 |
| JP | 62131837 | 6/1987 |
| JP | 6414700 | 1/1989 |
| JP | 1141137 | 6/1989 |
| JP | 4114587 | 4/1992 |
| JP | 5213113 | 8/1993 |
| JP | 6227318 | 8/1994 |
| JP | 06267304 | 9/1994 |

(56) References Cited

FOREIGN PATENT DOCUMENTS

| | | |
|---|---|---|
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| WO | WO8605147 | 9/1986 |
| WO | WO9419212 | 9/1994 |
| WO | WO9638319 | 12/1996 |
| WO | WO9735743 | 10/1997 |
| WO | WO2007111984 | 10/2007 |
| WO | WO2009073054 | 6/2009 |

OTHER PUBLICATIONS

Dana H. Ballard and Christopher M. Brown, Computer Vision, Prentice-Hall, Englewood Cliffs, New Jersey, 5 pages, 1982.

Tokimaru et al., "CMOS Rear-View TV System with CCD Camera", National Technical Report vol. 34, No. 3, pp. 329-336, Jun. 1988 (Japan).

* cited by examiner

VEHICULAR VISION SYSTEM

CROSS REFERENCE TO RELATED APPLICATIONS

The present application is a continuation of U.S. patent application Ser. No. 13/292,120, filed Nov. 9, 2011, now U.S. Pat. No. 8,142,059, which is a continuation of U.S. patent application Ser. No. 13/074,698, filed Mar. 29, 2011, now U.S. Pat. No. 8,070,332, which is a continuation of U.S. patent application Ser. No. 12/171,436, filed Jul. 11, 2008, now U.S. Pat. No. 7,914,187, which claims the benefit of U.S. provisional application Ser. No. 60/949,352, filed Jul. 12, 2007, which are hereby incorporated herein by reference in their entireties.

FIELD OF THE INVENTION

The present invention relates generally to vehicle lighting systems and, more particularly, to vehicle lighting systems that may control the headlamps of the vehicle.

BACKGROUND OF THE INVENTION

Vehicle vision systems and/or vehicle headlamp control systems are known and provide enhanced automatic control of the headlamps of a vehicle, typically in response to a detection of a threshold ambient light level and/or a detection of light (such as headlamps of oncoming vehicles and/or taillights of leading vehicles) in the region forward of the vehicle. Examples of such vision and/or headlamp control systems are described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties.

SUMMARY OF THE INVENTION

The present invention provides an automatic vehicle lighting system or light control system with an adaptive alignment function. The light control system of the present invention is operable to control or adjust the beam of a light of the vehicle (or of the headlamps or auxiliary light of the vehicle) in response to a detection of a gaze direction or head angle or pose or position of the head or eyes of the driver of the vehicle, so as to provide enhanced illumination in the direction that the driver is looking, such as toward road signs and/or the like along the road on which the vehicle is traveling.

Optionally, the light control system may be responsive to a detection of a gaze direction of a driving instructor (typically seated in the front passenger seat of the vehicle during a driving instruction or test for the person or student driving the vehicle). In such an application, the light control system provides the driving instructor with a tool to direct the attention of the student in a way that does not force the driver or student to look at the hand-pointing of the instructor, but at the relevant object which is illuminated or highlighted by the automatic adaptively-aligned lighting system.

According to an aspect of the present invention, an automatic lighting system for a vehicle includes a gaze detection device operable to determine a gaze direction of a driver or driving instructor or front seat occupant of a vehicle, an illumination source and a control. The illumination source is directed generally forwardly with respect to a direction of travel of the vehicle, and has an adjustable principal axis of illumination. The control is operable to adjust the principal axis of illumination of the illumination source in response to an output of the gaze detection device. The control adjusts the principal axis of illumination of the illumination source to direct illumination toward an area where the driver or driving instructor or front seat occupant of the vehicle is looking.

Optionally, the gaze detection device may comprise an imaging device for capturing images, with the imaging device having a field of view directed generally toward the head of a driver or driving instructor of the vehicle. An image processing device may process image data to determine the gaze direction of the driver or driving instructor of the vehicle. Optionally, the automatic lighting system may be selectively enabled and disabled in response to a human-machine interface or other systems or inputs. For example, such other systems may include an intelligent headlight system that detects other vehicles so that the host vehicle's light does not shine at the eyes of the driver of an oncoming or leading vehicle, a Global Positioning System (GPS), a roadside information system, the internet, an intelligent transportation system or information system, a communication system, a telematics system, a navigation system or the like, that may provide or generate an output, whereby the automatic illumination system may control the adjusting or enabling of the adaptive alignment light in response to such an output. For example, some geographical locations or jurisdictions may forbid or limit such adaptively aligned lighted systems, whereby it is envisioned that the automatic lighting system may override the adaptive alignment control or otherwise not adjust or limit the adjustment of the adaptive light when the vehicle is in such locations or jurisdictions (such as in response to an output of a global positioning system that is indicative of the vehicle being located at or in such a location or jurisdiction).

According to another aspect of the present invention, an automatic lighting system for a vehicle includes an imaging device for capturing images, a control and an illumination source directed generally forwardly with respect to the direction of travel of the vehicle. The imaging device has a field of view directed generally forwardly with respect to a direction of travel of the vehicle. The control is operable to process image data to determine if a sign, or other important object or object of interest (such as an object of interest to the driver or student or instructor), such as a deer or pedestrian or the like, is present generally forwardly and sidewardly of the vehicle as the vehicle travels along a road. The control is operable to adjust the illumination source in response to a detection of an object of interest (such as a sign or person or animal or other object) generally forwardly and sidewardly of the vehicle, with the control adjusting the illumination source to direct illumination toward an area encompassing the detected object of interest when the object of interest is detected.

These and other objects, advantages, purposes and features of the present invention will become more apparent upon review of the following specification in conjunction with the drawings.

DESCRIPTION OF THE PREFERRED EMBODIMENTS

Figure 1:
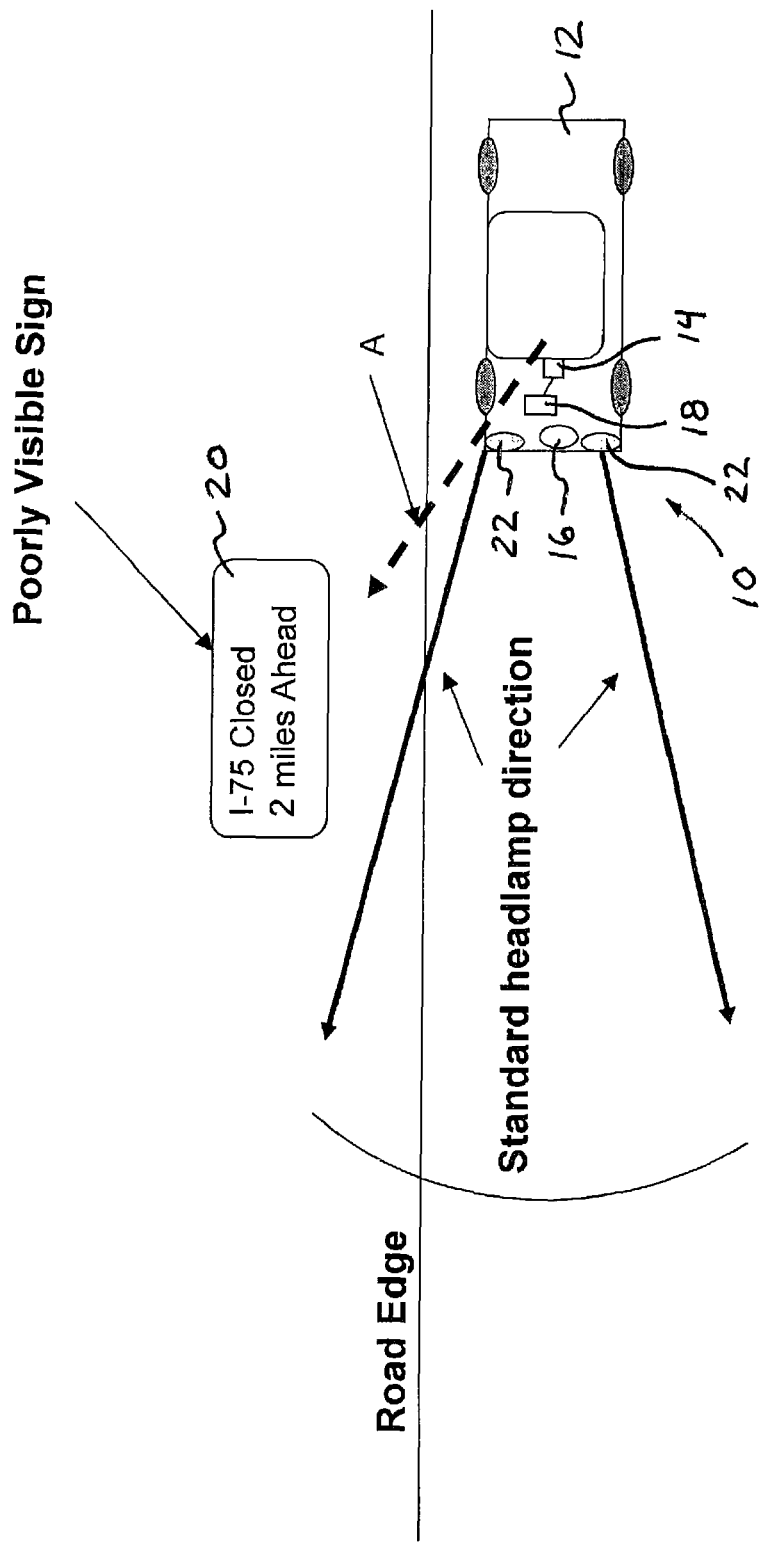
FIG. 1 is a schematic of a vehicle and lighting system, showing that the vehicle headlamps may not substantially illuminate a sign at the side of the road as the vehicle travels along the road and approaches and passes the sign.
Figure 2:
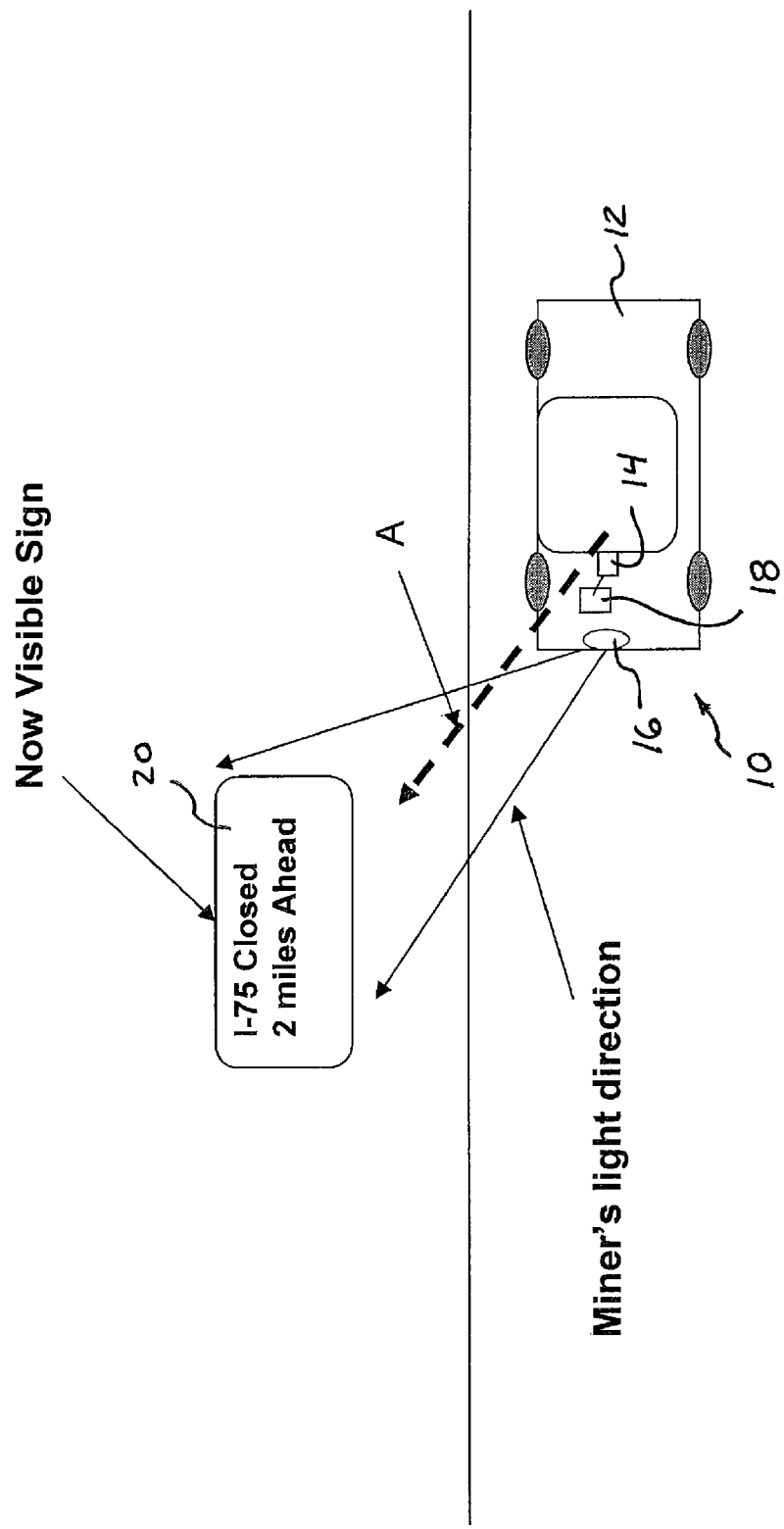
FIG. 2 is a schematic of a vehicle and lighting system in accordance with the present invention, showing an adjustment of illumination from an illumination source to provide enhanced illumination of a sign in response to the driver's or driving instructor's gaze direction or head direction being angled or directed generally toward the sign.

Referring now to the drawings and the illustrative embodiments depicted therein, an automatic lighting system or miner's lighting system 10 of a vehicle 12 includes a gaze detection device 14, such as an imaging device or the like, that is operable to determine a gaze direction or head angle or pose or position of the head or eyes of the driver or driving instructor or occupant of the vehicle, and an illumination source 16 or "miner's light" that is operable or adjustable to provide illumination generally in the direction of the detected gaze or head angle A, so as to provide enhanced illumination of an area that the driver or driving instructor of the vehicle is looking toward (FIGS. 1 and 2). A control or image processor 18 may process the image data to determine the gaze direction or line of sight A and may adjust the angled illumination source accordingly. For example, the illumination source 16 may provide a centrally located illumination source or light or light emitting diode(s) (LED) or the like at a forward portion of the vehicle, and the illumination source may be pivotable or adjustable to adjust its principal axis of illumination toward either side of the vehicle and generally forwardly of the vehicle (and optionally vertically), so as to provide enhanced illumination of a sign or object 20 or the like located forwardly of the vehicle 12 and toward the side of the vehicle as the vehicle travels along a road surface.

The gaze detection device 14 may comprise an imaging sensor or device, such as a pixelated imaging array having a plurality of photosensors arranged in a two dimensional array on a semiconductor substrate, such as a CMOS imaging array or the like. The imaging array may be located within the vehicle, such as in an interior rearview mirror of the vehicle or an accessory module of the vehicle or an overhead console of the vehicle, or steering wheel column of the vehicle or instrument panel of the vehicle or the like, with its field of view directed generally toward a region of the interior cabin of the vehicle that is occupied by or encompasses a head of a typical or average sized driver of the vehicle (at the driver's seat of the vehicle) or driving instructor of the vehicle (typically at the front passenger seat of the vehicle). Optionally, other gaze detecting devices may be implemented while remaining in the spirit and scope of the present invention. The control or image processor processes the image data captured by the imaging device (such as via any suitable processing means, such as via edge detection algorithms or biometric characteristic recognition/identification algorithms or the like) to determine the direction of the driver's or driving instructor's gaze, and adjusts or activates the illumination source in response thereto.

Optionally, the gaze detection device may comprise a cellular telephone with a camera or imaging sensor incorporated therein (or other personal camera device). For example, a camera telephone may be mounted or docked at the vehicle dashboard or interior mirror or elsewhere in the vehicle cabin with the camera directed toward the driver's head (or toward the head of a driving instructor), whereby images captured by the camera may be processed (by circuitry within the telephone or by vehicle-based or mirror-based circuitry or the like within the vehicle) to detect the driver's or driving instructor's gaze direction and activate or control the adjustable light accordingly. Such a system may utilize any suitable telephone or device incorporating a camera or image sensor, and may utilize aspects of the imaging systems described in U.S. provisional application Ser. No. 60/956,633, filed Aug. 17, 2007, which is hereby incorporated herein by reference in its entirety.

In the illustrated embodiment, the illumination source 16 is generally centrally located at a forward portion of the vehicle, and has its principal axis or beam of illumination adjustable toward either side for providing illumination at the targeted area or region at one side of the vehicle, such as at the right side of the vehicle off to the side of the road on which the vehicle is traveling. The illumination source may comprise any suitable illumination source, such as a light emitting diode (LED) or the like, or may comprise one or both of the headlamps of the vehicle. The illumination source may be adjustable, such as pivotable about an axis, or may be adjustable by selectively enabling or activating components, such as light emitting diodes or the like, to direct the illumination in the desired or targeted direction, or a baffle or light guiding element may be adjustably disposed in front of the illumination source and may be adjustable to adjust or guide the principal axis of illumination of the illumination source toward the targeted region at or near the side of the vehicle. Optionally, the adjustable nature of such a light may be accomplished by enabling or disabling or selectively activating/deactivating several individual components, such as individual lighting elements or light sources, such as individual ones of a plurality of or array of light emitting diodes disposed at or near the front of the vehicle, such that such selective activation and deactivation of the light sources results in an adjustment in the principal beam direction of the light sources (for example, the individual light sources may be directed in different directions so that activation of some lights results in a beam of light generally in one direction while activation of other lights results in a beam of light generally in another direction).

Optionally, the illumination source or sources may be vertically adjustable as well as adjustable laterally or side-to-side. Optionally, the range of such adjustment may be limited in the vertical dimension by an intelligent headlight system that is operable to detect the presence or absence of vehicles in the potential location of the adjustable "miner's light". For example, when a vehicle is detected or present in the desired or targeted "miner's light" direction (as determined by the gaze detection system), the light could be further adjusted downward or partially disabled or limited in its upward adjustment so as to prevent glaring light towards the driver or drivers of such other vehicle or vehicles detected ahead of the subject or host vehicle.

Optionally, the range of adjustability of the illumination source may be limited to only the right side of the vehicle (for vehicles that travel on the right side of the road) so as to limit directing the light toward oncoming or approaching traffic forwardly of and to the left of the controlled vehicle. In such applications, the adjustable illumination source may be located at or toward the right side of the vehicle, such as at the front right portion of the vehicle or at the right side portion of the vehicle, so as to be readily directed sidewardly toward the right side of the road while leftward illumination is limited. Optionally, however, the range of adjustability may include movement or directing of light toward the left side of the vehicle, whereby such leftward illumination may be limited to an upwardly directed angle, such as, for example, an angle greater than 10 degrees above horizontal or thereabouts, so as to limit directing the light toward the eyes of the drivers of the oncoming or approaching vehicles. The headlamps of the controlled vehicle remain in their forward angle or orientation to provide the forward illumination of the road in front of the vehicle and are not affected by the adjustment of the illumination source. Optionally, however, the adjustable illumination source may be incorporated into the headlamp 22 (either as a separate illumination source at the headlamps or as an adjustable headlamp), while remaining within the spirit and scope of the present invention.

In situations or road conditions where the driver's or driving instructor's gaze moves back and forth repeatedly, the tracking of eye or head gaze direction could cause excessive swinging or moving of the light that may become annoying to the driver (or others in the vehicle or outside of the vehicle) and/or that may cause fatigue of the driver or driving instructor. Thus, it may be beneficial in such situations for the driver or driving instructor to be able to selectively deactuate or disable or limit the tracking and adjustment function of the present invention. Thus, it is envisioned that the miner's light or adjustable lighting function or system may be selectively or episodically activated so that the illumination source is adjusted in certain situations and not in others, such as in response to a user input or a control input or image input or the like. For example, a user input or control button may be provided at the steering wheel of the vehicle (or elsewhere in the vehicle, such as at the instrument panel or console or overhead console or mirror assembly or the like, where it may be readily accessible by the driver or driving instructor of the vehicle), whereby the user or driver or driving instructor may selectively actuate or enable and deactuate or disable the illumination source or system and/or the adjustment function of the illumination source or system. Optionally, the enabling or disabling of the light alignment system of the present invention could be partial, with limits determined by the same systems also used for total enabling and total disabling of the system. Optionally, the system may be operable to adjust the miner's light only when the gaze direction is generally maintained for a threshold period of time (such as around one second or thereabouts) and the system may not adjust the miner's light when the detected gaze direction is rapidly moving and/or not directed toward an object of interest or the like.

Optionally, the user input to enable/disable the illumination system may comprise other types of human-machine interface, such as, for example, a manual input or voice recognition system or the like. Optionally, the enablement/disablement function of the illumination system may be in response to a camera or imaging device that detects driver or driving instructor movements that are indicative of a situation where the illumination system should be disabled, such as a detection of repeated blinking by the driver or driving instructor or predetermined head movements by the driver or driving instructor or hand movements by the driver or driving instructor or the like. Other user inputs or human-machine interfaces may be implemented to enable/disable/limit the adjustable illumination system while remaining within the spirit and scope of the present invention. For example, intelligent headlight systems that detect vehicles in front of the host vehicle, Global Positioning Systems, roadside information systems or other information systems, the internet, intelligent transportation systems, communication systems or telematics systems or navigation systems (such as a communication system or telematics system that receives a signal or information data from a remote source, such as a telematics system or navigation system utilizing aspects of the systems described in U.S. Pat. Nos. 7,004,593; 6,678,614; 6,477,464; 6,690,268; and/or 7,167,796, which are hereby incorporated herein by reference in their entireties) or the like may also function to disable, enable, or partially enable or limit the operation of the adjustable illumination system.

Figure 3:
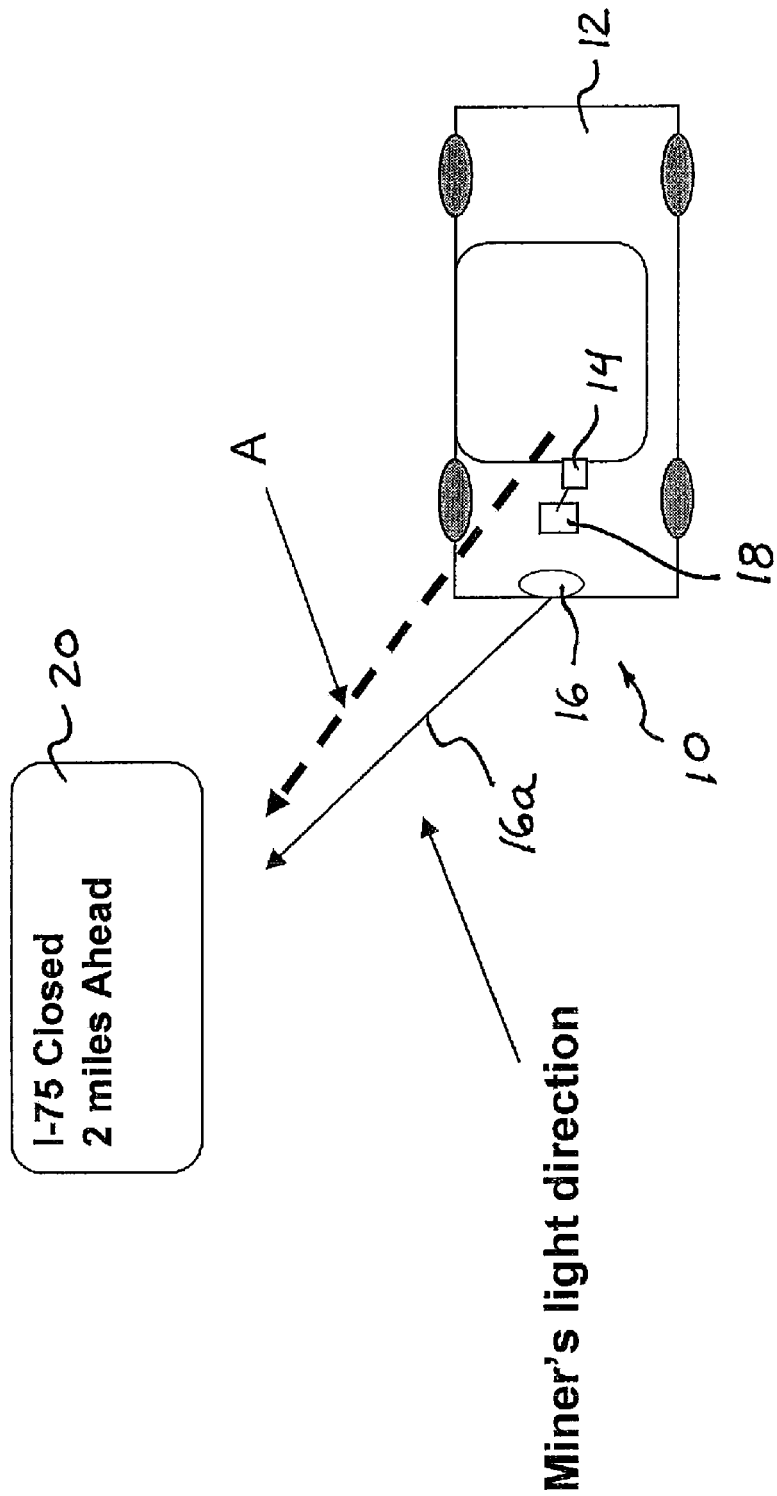
FIG. 3 is another schematic of another vehicle and lighting system in accordance with the present invention, showing that the principal axis of illumination from the illumination source may be adjusted to account for the offset of the illumination source from the driver or driving instructor.

Optionally, because the illumination source and the driver's or driving instructor's eyes or head may be separated by a substantial distance, such as about two meters or thereabouts, it is envisioned that the adjusted angle of the principal axis of illumination 16*a* may be different than the angle of the gaze direction A, in order to account for the parallax of the sign or object of interest with respect to the driver or driving instructor and the illumination source. As shown in FIG. 3, the control may determine the gaze direction and adjust the direction of the illumination source to account for such parallax, so that the illumination source provides enhanced illumination of the sign or object or area at which the driver's or driving instructor's gaze is directed. The system may detect a sign or object at or near the side of the road in the direction of the driver's gaze and may adjust the principal axis of illumination responsive to the gaze direction and a distance to the detected sign or object along the axis of the gaze direction.

Optionally, the automatic lighting system of the present invention may be used in conjunction with an object recognition system (such as a system operable to detect and/or recognize a sign, animal, such as a large animal such as a deer or the like, pedestrian, or other object) or the like of the vehicle (such as, for example, a sign recognition system utilizing aspects of the systems described in U.S. Pat. Nos. 6,396,397; 6,946,978 and/or 7,004,606, and/or U.S. patent application Ser. No. 11/105,757, filed Apr. 14, 2005, now U.S. Pat. No. 7,526,103, which are hereby incorporated herein by reference in their entireties). For example, the lighting system may include an imaging device (such as a pixelated imaging array or the like or such as a cellular phone with a camera that is mounted or docked in the vehicle or any suitable imaging device or camera or the like) that has a field of view directed generally forwardly with respect to the direction of travel of the vehicle, and that captures images of the scene generally forwardly and/or toward a side of the vehicle, so as to capture images of signs, or other important objects or objects of interest, along the road on which the vehicle is traveling. The control may process the image data to determine if a sign or other object of interest is present forwardly and/or sidewardly of the vehicle, and the illumination source (or principal beam of illumination) may be automatically actuated or adjusted to at least briefly provide illumination of the sign or object of interest. The illumination source thus may automatically illuminate signs or other objects of interest at the side of the road, such as to provide automatic illumination for the driver's or driving instructor's enhanced viewing, or to provide enhanced illumination for an object recognition system of the vehicle (such as a system operable to detect and/or recognize or identify a sign, animal or deer or pedestrian or the like) or the like. The adjustment of the illumination source in response to image processing of image data captured by a forward facing camera may function in conjunction with or independently of the miner's light function described above.

For applications with an object recognition system, the imaging device may automatically capture at least one image of the object when the object is illuminated by the illumination source, whereby the control may process the image data of the illuminated object to determine or recognize characters on the sign, or important or identifiable characteristics of the detected object. For example, an object recognition system may function to determine the nature or classification of a detected object by determining a size of the detected object of interest, a shape of the detected object of interest, a distance to the detected object of interest, and/or a direction toward the detected object of interest and/or the like. Optionally, the control may direct or adjust and flash the illumination source in response to detection of the object (and with the principal axis of the beam of illumination being directed generally toward the detected sign or object), whereby the imaging device may be synchronized with the flashing illumination source to capture one or more images of the object during the brief period of time that the sign or object area is illuminated. Optionally, the illumination source may comprise an infrared or near infrared illumination source and the imaging device may be sensitive to infrared or near infrared illumination, such that the illumination source may provide illumination of the sign or area in a manner that provides enhanced sensing by the imaging device without distracting the driver of the vehicle. Optionally, the object recognition system may output to the driver with a human machine interface modality, such as a visual display, warning light, audio device, or haptic system or the like, information about the detected and recognized object. Such output or outputs may be enhanced beyond the output capabilities available in situations where the object is not additionally illuminated by the adaptively-aligned illumination system.

Therefore, the present invention provides an automatic lighting system that provides enhanced illumination of a sign or important object or object of interest (such as deer or pedestrians) area at a side of a road or toward a side of a vehicle traveling along the road to enhance the viewing by the driver and/or imaging device of signs and the like as the vehicle travels along the road during night time or low lighting driving conditions. The system may monitor the driver's or driving instructor's eyes or head position or orientation to determine a gaze direction and may adjust or activate an illumination source accordingly. The illumination system may be installed in the vehicle during manufacture of the vehicle or may be an aftermarket system. Optionally, the illumination source may provide low intensity light in the general off-road direction, while the headlamps provide higher intensity light in the forward direction of travel of the vehicle. Optionally, the illumination source may provide a localized beam of light that is directed toward a particular sign or point of interest or object of interest at or near the side of the road. Optionally, the lighting system of the present invention may be responsive to an input from a steering wheel angle sensor, so that the illumination source may be activated or adjusted to illuminate a side region of the road in response to a detection of a turning of the steering wheel of the vehicle. Optionally, the lighting system of the present invention may provide a wider or taller beam pattern for enhanced illumination of the targeted area or object, depending on or responsive to one or more of the inputs discussed above.

The present invention thus provides for enhanced lighting of signs and the like at the side of the road and provides enhanced lighting of other regions that are typically outside a typical headlight range and orientation of the headlights of the vehicle. The imaging device and control and image processor and illumination source may comprise any suitable components, and may utilize aspects of the vision systems of the text described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The imaging device and/or control may be part of or share components or circuitry with other image or imaging or vision systems of the vehicle, such as headlamp control systems and/or rain sensing systems and/or cabin monitoring systems and/or the like.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A vehicular vision system suitable for use in a vehicle, said vehicular vision system comprising:
   an imaging device having a field of view at least generally forwardly with respect to a forward direction of travel of a vehicle equipped with said vehicular vision system;
   wherein said imaging device is operable to capture image data;
   a control operable to process said captured image data;
   wherein said control is operable to process said captured image data to detect objects present at least one of (i) generally forwardly of the equipped vehicle as the equipped vehicle travels along the road and (ii) generally sidewardly of the equipped vehicle as the equipped vehicle travels along the road;
   wherein said objects comprise at least one selected from the group consisting of (i) a sign ahead of the equipped vehicle, (ii) an animal ahead of the equipped vehicle and (iii) a pedestrian ahead of the equipped vehicle;
   wherein said control is operable to process said captured image data to detect an oncoming headlight or a leading taillight of another vehicle ahead of the equipped vehicle;
   an illumination source operable to illuminate at least one of generally forwardly of the equipped vehicle and generally sidewardly of the equipped vehicle, wherein said illumination source comprises an array of light emitting diodes and wherein illumination emanating from said illumination source is adjustable via selectively activating at least some individual light emitting diodes of said array of light emitting diodes; and
   wherein said selective activation of at least some individual light emitting diodes of said array of light emitting diodes is responsive, at least in part, to a detection of an oncoming headlight or a leading taillight of another vehicle forward of the equipped vehicle.

2. The vehicular vision system of claim 1, wherein said control is operable to process said captured image data to determine if an object present in the field of view of said imaging device is an object of interest to a driver of the equipped vehicle.

3. The vehicular vision system of claim 2, wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object.

4. The vehicular vision system of claim 2, wherein said control is operable to determine that an object present in the field of view of said imaging device that is determined to be an object of interest is a pedestrian.

5. The vehicular vision system of claim 2, wherein an object present in the field of view of said imaging device that is determined to be an object of interest comprises a sign and wherein said control is operable to process said captured image data to determine or recognize characters on the sign.

6. The vehicular vision system of claim 2, wherein, responsive to a determination that an object present in the field of view of said imaging device is an object of interest, said control is operable to adjust illumination of an area encompassing the object of interest.

7. The vehicular vision system of claim 6, wherein said object of interest comprises an oncoming vehicle.

8. The vehicular vision system of claim 6, wherein said control is operable to adjust illumination emanating from said illumination source in at least one of a horizontal direction and a vertical direction.

9. The vehicular vision system of claim 2, wherein at least one of (a) responsive to a determination that an object present in the field of view of said imaging device is an object of interest, said control is operable to adjust illumination of an area encompassing the object of interest and wherein the object of interest comprises an oncoming headlight or a leading taillight of another vehicle forward of the equipped vehicle, (b) responsive to a determination that an object present in the field of view of said imaging device is an object of interest, said control is operable to adjust illumination of an area encompassing the object of interest and wherein the object of interest comprises a pedestrian, (c) responsive to a determination that an object present in the field of view of said imaging device is an object of interest, said control is operable to adjust illumination of an area encompassing the object of interest and wherein the object of interest comprises an oncoming vehicle, and (d) responsive to a determination that an object present in the field of view of said imaging device is an object of interest, said control is operable to adjust illumination emanating from said illumination source in at least one of a horizontal direction and a vertical direction.

10. The vehicular vision system of claim 2, wherein, responsive to a determination that an object present in the field of view of said imaging device is an object of interest, said control is operable to generate an alert to the driver of the equipped vehicle.

11. The vehicular vision system of claim 10, wherein said alert comprises at least one of (a) a visual display, (b) a warning light, (c) an audible signal and (d) a haptic alert.

12. The vehicular vision system of claim 1, wherein said selective activation adjusts a light beam emanating from said illumination source.

13. The vehicular vision system of claim 1, wherein said plurality of light emitting diodes of said illumination source is at least one of (a) actuated to at least briefly illuminate an object that is determined to be an object of interest and (b) adjusted to at least briefly illuminate an object that is determined to be an object of interest.

14. The vehicular vision system of claim 1, wherein at least some of said light emitting diodes comprise at least one of infrared light emitting diodes and near infrared radiating light emitting diodes, and wherein said imaging device is sensitive to at least one of infrared radiation and near infrared radiation.

15. The vehicular vision system of claim 1, wherein activation of some of said light emitting diodes results in illumination generally in one direction while activation of others of said light emitting diodes results in illumination generally in a different direction.

16. The vehicular vision system of claim 1, wherein activation of some of said light emitting diodes results in a first beam of light while activation of others of said light emitting diodes results in a second beam of light.

17. The vehicular vision system of claim 16, wherein said first beam of light is generally in one direction and said second beam of light is generally in another direction.

18. The vehicular vision system of claim 1, wherein said illumination source comprises at least one of (a) a baffle and (b) a light guiding element.

19. The vehicular vision system of claim 18, wherein said illumination source comprises a baffle and wherein illumination emanating from said illumination source is adjustable via said baffle.

20. The vehicular vision system of claim 1, wherein said illumination source is located at a forward portion of the equipped vehicle.

21. The vehicular vision system of claim 1, wherein said illumination source comprises a headlight of the equipped vehicle.

22. The vehicular vision system of claim 1, wherein said vehicular vision system is selectively enabled and disabled in response to an output of at least one of (a) a human-machine interface, (b) an intelligent headlight system that detects vehicles in front of the equipped vehicle, (c) a Global Positioning System, (d) a roadside information system, (e) the internet, (f) an intelligent transportation system, (g) a communication system, (h) a telematics system and (i) a navigation system.

23. The vehicular vision system of claim 1, comprising a gaze detection device operable to determine a gaze direction of the driver or a driving instructor of the equipped vehicle, wherein said gaze detection device comprises a second imaging device for capturing image data, said second imaging device having a field of view generally toward the head of the driver or driving instructor of the equipped vehicle, wherein an image processing device is operable to process said image data captured by said second imaging device to determine the gaze direction of the driver or driving instructor of the equipped vehicle, and wherein said control is operable to adjust illumination emanating from said illumination source in response to an output of said gaze detection device, and wherein said control is operable to illuminate an area generally forwardly and sidewardly of the equipped vehicle where the driver or driving instructor of the equipped vehicle is looking.

24. A vehicular vision system suitable for use in a vehicle, said vehicular vision system comprising:

an imaging device having a field of view at least generally forwardly with respect to a forward direction of travel of a vehicle equipped with said vehicular vision system;

wherein said imaging device is operable to capture image data;

a control operable to process said captured image data;

wherein said control is operable to process said captured image data to determine if an object present in the field of view of said imaging device is an object of interest to a driver of the equipped vehicle;

wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object;

wherein said object of interest comprises one of (i) a sign ahead of the equipped vehicle, (ii) an animal ahead of the equipped vehicle and (iii) a pedestrian ahead of the equipped vehicle;

wherein said control is operable to process said captured image data to detect an oncoming headlight or a leading taillight of another vehicle ahead of the equipped vehicle;

a headlight operable to illuminate at least one of generally forwardly of the equipped vehicle and generally sidewardly of the equipped vehicle, wherein said headlight comprises an array of light emitting diodes and wherein illumination emanating from said headlight is adjustable via selectively activating at least some individual light emitting diodes of said array of light emitting diodes; and wherein said selective activation of at least some individual light emitting diodes of said array of light emitting diodes is responsive, at least in part, to a detection of an oncoming headlight or a leading taillight of another vehicle forward of the equipped vehicle.

25. The vehicular vision system of claim 24, wherein said control is operable to determine that an object present in the field of view of said imaging device that is determined to be an object of interest is a pedestrian.

26. The vehicular vision system of claim 24, wherein an object present in the field of view of said imaging device that is determined to be an object of interest comprises a sign and wherein said control is operable to process said captured image data to determine or recognize characters on the sign.

27. The vehicular vision system of claim 24, wherein at least one of (a) responsive to a determination that an object present in the field of view of said imaging device is an object of interest, said control is operable to adjust illumination of an area encompassing the object of interest, (b) responsive to a determination that an object present in the field of view of said imaging device is an object of interest, said control is operable to adjust illumination of an area encompassing the object of interest and wherein the object of interest comprises an oncoming headlight or a leading taillight of another vehicle forward of the equipped vehicle, (c) responsive to a determination that an object present in the field of view of said imaging device is an object of interest, said control is operable to adjust illumination of an area encompassing the object of interest and wherein the object of interest comprises a pedestrian, (d) responsive to a determination that an object present in the field of view of said imaging device is an object of interest, said control is operable to adjust illumination of an area encompassing the object of interest and wherein the object of interest comprises an oncoming vehicle, (e) responsive to a determination that an object present in the field of view of said imaging device is an object of interest, said control is operable to adjust illumination of an area encompassing the object of interest and said control is operable to adjust illumination emanating from said headlight in at least one of a horizontal direction and a vertical direction, (f) responsive to a determination that an object present in the field of view of said imaging device is an object of interest, said control is operable to adjust illumination emanating from said headlight in at least one of a horizontal direction and a vertical direction, and (g) wherein said selective activation adjusts a light beam emanating from said headlight.

28. The vehicular vision system of claim 24, wherein, responsive to a determination that an object present in the field of view of said imaging device is an object of interest, said control is operable to generate an alert to the driver of the equipped vehicle, and wherein said alert comprises at least one of (a) a visual display, (b) a warning light, (c) an audible signal and (d) a haptic alert.

29. The vehicular vision system of claim 24, wherein at least some of said light emitting diodes comprise at least one of infrared light emitting diodes and near infrared radiating light emitting diodes, and wherein said imaging device is sensitive to at least one of infrared radiation and near infrared radiation.

30. The vehicular vision system of claim 24, wherein activation of some of said light emitting diodes results in illumination generally in one direction while activation of others of said light emitting diodes results in illumination generally in a different direction.

31. The vehicular vision system of claim 24, wherein activation of some of said light emitting diodes results in a first beam of light while activation of others of said light emitting diodes results in a second beam of light.

32. The vehicular vision system of claim 31, wherein said first beam of light is generally in one direction and said second beam of light is generally in another direction.

33. The vehicular vision system of claim 24, wherein said headlight comprises at least one of (a) a baffle and (b) a light guiding element.

34. The vehicular vision system of claim 33, wherein said headlight comprises a baffle and wherein illumination emanating from said headlight is adjustable via said baffle.

35. A vehicular vision system suitable for use in a vehicle, said vehicular vision system comprising:

an imaging device having a field of view at least generally forwardly with respect to a forward direction of travel of a vehicle equipped with said vehicular vision system;

wherein said imaging device is operable to capture image data;

a control operable to process said captured image data;

wherein said control is operable to process said captured image data to detect at least one of (i) a sign ahead of the equipped vehicle, (ii) an animal ahead of the equipped vehicle and (iii) a pedestrian ahead of the equipped vehicle;

wherein said control is operable to process said captured image data to detect an oncoming headlight or a leading taillight of another vehicle ahead of the equipped vehicle;

a headlight operable to illuminate at least one of generally forwardly of the equipped vehicle and generally sidewardly of the equipped vehicle, wherein said headlight comprises an array of light emitting diodes and wherein illumination emanating from said headlight is adjustable via selectively activating at least some individual light emitting diodes of said array of light emitting diodes;

wherein said selective activation of at least some individual light emitting diodes of said array of light emitting diodes is responsive, at least in part, to a detection of an oncoming headlight or a leading taillight of another vehicle forward of the equipped vehicle; and wherein at least one of (a) responsive to a determination that an object present in the field of view of said imaging device is an object of interest, said control is operable to adjust illumination of an area encompassing the object of interest, (b) responsive to a determination that an object present in the field of view of said imaging device is an object of interest, said control is operable to adjust illumination of an area encompassing the object of interest and wherein the object of interest comprises an oncoming headlight or a leading taillight of another vehicle forward of the equipped vehicle, (c) responsive to a determination that an object present in the field of view of said imaging device is an object of interest, said control is operable to adjust illumination of an area encompassing the object of interest and wherein the object of interest comprises a pedestrian, (d) responsive to a determination that an object present in the field of view of said imaging device is an object of interest, said control is operable to adjust illumination of an area encompassing the object of interest and wherein the object of interest comprises an oncoming vehicle, (e) responsive to a determination that an object present in the field of view of said imaging device is an object of interest, said control is operable to adjust illumination of an area encompassing the object of interest and said control is operable to adjust illumination emanating from said headlight in at least one of a horizontal direction and a vertical direction, (f) said selective activation adjusts a light beam emanating from said headlight, and (g) responsive to a determination that an object present in the field of view of said imaging device is an object of interest, said control is operable to adjust illumination emanating from said headlight in at least one of a horizontal direction and a vertical direction.

36. The vehicular vision system of claim 35, wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object.

37. The vehicular vision system of claim 35, wherein at least one of (a) said control is operable to determine that an object present in the field of view of said imaging device that is determined to be an object of interest is a pedestrian, and (b) an object present in the field of view of said imaging device that is determined to be an object of interest comprises a sign and wherein said control is operable to process said captured image data to determine or recognize characters on the sign.

38. The vehicular vision system of claim 35, wherein, responsive to a determination that an object present in the field of view of said imaging device is an object of interest, said control is operable to generate an alert to the driver of the equipped vehicle, and wherein said alert comprises at least one of (a) a visual display, (b) a warning light, (e) an audible signal and (d) a haptic alert.

39. The vehicular vision system of claim 35, wherein at least one of (a) activation of some of said light emitting diodes results in illumination generally in one direction while activation of others of said light emitting diodes results in illumination generally in a different direction, (b) activation of some of said light emitting diodes results in a first beam of light while activation of others of said light emitting diodes results in a second beam of light, and (c) activation of some of said light emitting diodes results in a first beam of light while activation of others of said light emitting diodes results in a second beam of light and said first beam of light is generally in one direction and said second beam of light is generally in another direction.

40. The vehicular vision system of claim 39, wherein said headlight comprises at least one of (a) a baffle and (b) a light guiding element.

41. The vehicular vision system of claim 40, wherein said headlight comprises a baffle and wherein illumination emanating from said headlight is adjustable via said baffle.

42. A vehicular vision system suitable for use in a vehicle, said vehicular vision system comprising:

an imaging device having a field of view at least generally forwardly with respect to a forward direction of travel of a vehicle equipped with said vehicular vision system;

wherein said imaging device is operable to capture image data;

a control operable to process said captured image data;

wherein said control is operable to process said captured image data to detect at least one of (i) a sign ahead of the equipped vehicle, (ii) an animal ahead of the equipped vehicle and (iii) pedestrian ahead of the equipped vehicle;

wherein said control is operable to process said captured image data to detect an oncoming headlight or a leading taillight of another vehicle ahead of the equipped vehicle;

an illumination source operable to illuminate at least one of generally forwardly of the equipped vehicle and generally sidewardly of the equipped vehicle, wherein said illumination source comprises an array of light emitting diodes and wherein illumination emanating from said illumination source is adjustable via selectively activating at least some individual light emitting diodes of said array of light emitting diodes;

wherein said selective activation of at least some individual light emitting diodes of said array of light emitting diodes is responsive, at least in part, to a detection of an oncoming headlight or a leading taillight of another vehicle forward of the equipped vehicle; and wherein, responsive to a determination that an object present in the field of view of said imaging device is an object of interest, said control is operable to adjust illumination of an area encompassing the object of interest and wherein the object of interest comprises an oncoming headlight or a leading taillight of another vehicle forward of the equipped vehicle.

43. The vehicular vision system of claim 42, wherein at least one of (a) responsive to a determination that an object present in the field of view of said imaging device is an object of interest, said control is operable to adjust illumination of an area encompassing the object of interest and wherein the object of interest comprises a pedestrian, (b) responsive to a determination that an object present in the field of view of said imaging device is an object of interest, said control is operable to adjust illumination of an area encompassing the object of interest and wherein the object of interest comprises an oncoming vehicle, (c) responsive to a determination that an object present in the field of view of said imaging device is an object of interest, said control is operable to adjust illumination of an area encompassing the object of interest and said control is operable to adjust illumination emanating from said illumination source in at least one of a horizontal direction and a vertical direction, (d) responsive to a determination that an object present in the field of view of said imaging device is an object of interest, said control is operable to adjust illumination emanating from said illumination source in at least one of a horizontal direction and a vertical direction, and (e) wherein said selective activation adjusts a light beam emanating from said illumination source.

44. The vehicular vision system of claim 42, wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object.

45. The vehicular vision system of claim 42, wherein at least one of (a) said control is operable to determine that an object present in the field of view of said imaging device that is determined to be an object of interest is a pedestrian, and (b) an object present in the field of view of said imaging device that is determined to be an object of interest comprises a sign and wherein said control is operable to process said captured image data to determine or recognize characters on the sign.

46. The vehicular vision system of claim 42, wherein, responsive to a determination that an object present in the field of view of said imaging device is an object of interest, said control is operable to generate an alert to the driver of the equipped vehicle, and wherein said alert comprises at least one of (a) a visual display, (b) a warning light, (c) an audible signal and (d) a haptic alert.

47. The vehicular vision system of claim 42, wherein at least one of (a) activation of some of said light emitting diodes results in illumination generally in one direction while activation of others of said light emitting diodes results in illumination generally in a different direction, (b) activation of some of said light emitting diodes results in a first beam of light while activation of others of said light emitting diodes results in a second beam of light, and (c) activation of some of said light emitting diodes results in a first beam of light while activation of others of said light emitting diodes results in a second beam of light and said first beam of light is generally in one direction and said second beam of light is generally in another direction.

48. The vehicular vision system of claim 42, wherein said illumination source comprises at least one of (a) a baffle and (b) a light guiding element.

49. The vehicular vision system of claim 48, wherein said illumination source comprises a baffle and wherein illumination emanating from said illumination source is adjustable via said baffle.

50. A vehicular vision system suitable for use in a vehicle, said vehicular vision system comprising:
    an imaging device having a field of view at least generally forwardly with respect to a forward direction of travel of a vehicle equipped with said vehicular vision system;
    wherein said imaging device is operable to capture image data;
    a control operable to process said captured image data;
    wherein said control is operable to process said captured image data to detect objects present at least one of (i) generally forwardly of the equipped vehicle as the equipped vehicle travels along the road and (ii) generally sidewardly of the equipped vehicle as the equipped vehicle travels along the road;
    wherein said objects comprise at least one selected from the group consisting of (i) a sign ahead of the equipped vehicle, (ii) an animal ahead of the equipped vehicle and (iii) a pedestrian ahead of the equipped vehicle;
    wherein said control is operable to process said captured image data to detect an oncoming headlight or a leading taillight of another vehicle ahead of the equipped vehicle;
    a headlight operable to illuminate at least one of generally forwardly of the equipped vehicle and generally sidewardly of the equipped vehicle;
    wherein said headlight comprises a baffle and wherein illumination emanating from said headlight is adjustable via said baffle;
    wherein said control is operable to process said captured image data to determine if an object present in the field of view of said imaging device is an object of interest to a driver of the equipped vehicle; and
    wherein, responsive to a determination that an object present in the field of view of said imaging device is an object of interest, said control is operable to adjust illumination of an area encompassing the object of interest and wherein the object of interest comprises an oncoming vehicle.

51. The vehicular vision system of claim 50, wherein at least one of (a) responsive to a determination that an object present in the field of view of said imaging device is an object of interest, said control is operable to adjust illumination of an area encompassing the object of interest and wherein the object of interest comprises a pedestrian, (b) responsive to a determination that an object present in the field of view of said imaging device is an object of interest, said control is operable to adjust illumination of an area encompassing the object of interest and said control is operable to adjust illumination emanating from said headlight in at least one of a horizontal direction and a vertical direction, and (c) responsive to a determination that an object present in the field of view of said imaging device is an object of interest, said control is operable to adjust illumination emanating from said headlight in at least one of a horizontal direction and a vertical direction.

52. The vehicular vision system of claim 51, wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object.

53. A vehicular vision system suitable for use in a vehicle, said vehicular vision system comprising:
    an imaging device having a field of view at least generally forwardly with respect to a forward direction of travel of a vehicle equipped with said vehicular vision system;
    wherein said imaging device is operable to capture image data;
    a control operable to process said captured image data;
    wherein said control is operable to process said captured image data to detect an oncoming headlight or a leading taillight of another vehicle ahead of the equipped vehicle;
    a headlight operable to illuminate at least one of generally forwardly of the equipped vehicle and generally sidewardly of the equipped vehicle;
    wherein said headlight comprises a baffle and wherein a forward lighting light beam emanating from said headlight is adjustable via said baffle; and
    wherein, responsive to a detection by said control of an oncoming headlight or a leading taillight of another vehicle ahead of the equipped vehicle, said control controls said baffle to adjust said forward lighting light beam in order to reduce light emanating from said headlight glaring a driver of the detected other vehicle ahead of the equipped vehicle.

54. The vehicular vision system of claim 53, wherein said control processes said captured image data to determine if an object present in the field of view of said imaging device is an object of interest to a driver of the equipped vehicle, and wherein at least one of (a) responsive to a determination by said control that an object present in the field of view of said imaging device is an object of interest, said control is operable to adjust illumination of an area encompassing the object of interest and wherein the object of interest comprises a pedestrian, (b) responsive to a determination by said control that an object present in the field of view of said imaging device is an object of interest, said control is operable to adjust illumination of an area encompassing the object of interest and said control is operable to adjust illumination emanating from said headlight in at least one of a horizontal direction and a vertical direction, and (c) responsive to a determination by said control that an object present in the field of view of said imaging device is an object of interest, said control is operable to adjust illumination emanating from said headlight in at least one of a horizontal direction and a vertical direction.

55. The vehicular vision system of claim 53, wherein said control processes said captured image data to determine if an object present in the field of view of said imaging device is an object of interest to a driver of the equipped vehicle at least in part by determining at least one of (a) a size of the object, (b) a shape of the object, (c) a distance to the object and (d) a direction toward the object.

56. The vehicular vision system of claim 53, wherein said vehicular vision system is selectively enabled and disabled in response to an output of at least one of (a) a human-machine interface, (b) a Global Positioning System, (c) a roadside information system, (d) the internet, (e) an intelligent transportation system, (f) a communication system, (g) a telematics system and (h) a navigation system.

57. The vehicular vision system of claim 53, wherein said control is operable to process said captured image data to detect an oncoming headlight or a leading taillight of another vehicle ahead of the equipped vehicle utilizing algorithmic decision-making.

58. The vehicular vision system of claim 57, wherein said algorithmic decision-making comprises use of an edge detection algorithm.

59. The vehicular vision system of claim 57, wherein said algorithmic decision-making involves at least one of (a) a size of an oncoming headlight or a leading taillight of another vehicle ahead of the equipped vehicle, (b) a shape of an oncoming headlight or a leading taillight of another vehicle ahead of the equipped vehicle, (c) a distance to an oncoming headlight or a leading taillight of another vehicle ahead of the equipped vehicle and (d) a direction toward an oncoming headlight or a leading taillight of another vehicle ahead of the equipped vehicle.

60. A vehicular vision system suitable for use in a vehicle, said vehicular vision system comprising:
a CMOS imaging device having a field of view at least generally forwardly with respect to a forward direction of travel of a vehicle equipped with said vehicular vision system;
wherein said imaging device is operable to capture image data;
a control operable to process said captured image data;
wherein said control is operable to process said captured image data to detect an oncoming headlight or a leading taillight of another vehicle ahead of the equipped vehicle;
wherein said control is operable to process said captured image data to detect an oncoming headlight or a leading taillight of another vehicle ahead of the equipped vehicle utilizing algorithmic decision-making;
a headlight operable to illuminate at least one of generally forwardly of the equipped vehicle and generally sidewardly of the equipped vehicle;
wherein said headlight comprises a baffle and wherein a forward lighting light beam emanating from said headlight is adjustable via said baffle; and
wherein, responsive to a detection by said control of an oncoming headlight or a leading taillight of another vehicle ahead of the equipped vehicle, said control controls said baffle to adjust said forward lighting light beam in order to reduce light emanating from said headlight glaring a driver of the detected other vehicle ahead of the equipped vehicle.

61. The vehicular vision system of claim 60, wherein said algorithmic decision-making comprises use of an edge detection algorithm.

62. The vehicular vision system of claim 60, wherein said algorithmic decision-making involves at least one of (a) a size of an oncoming headlight or a leading taillight of another vehicle ahead of the equipped vehicle, (b) a shape of an oncoming headlight or a leading taillight of another vehicle ahead of the equipped vehicle, (c) a distance to an oncoming headlight or a leading taillight of another vehicle ahead of the equipped vehicle and (d) a direction toward an oncoming headlight or a leading taillight of another vehicle ahead of the equipped vehicle.

63. The vehicular vision system of claim 60, wherein said CMOS imaging device is part of an interior rearview mirror assembly of the equipped vehicle.

64. The vehicular vision system of claim 63, wherein processing by said control of said captured image data to detect an oncoming headlight or a leading taillight of another vehicle ahead of the equipped vehicle is performed, at least in part, by circuitry that is part of said interior rearview mirror assembly of the equipped vehicle.

65. A vehicular vision system suitable for use in a vehicle, said vehicular vision system comprising:
an imaging device having a field of view at least generally forwardly with respect to a forward direction of travel of a vehicle equipped with said vehicular vision system;
wherein said imaging device is operable to, capture image data;
a control operable to process said captured image data;
wherein said control is operable to process said captured image data to detect an oncoming headlight or a leading taillight of another vehicle ahead of the equipped vehicle;
wherein said control is operable to process said captured image data to detect an oncoming headlight or a leading taillight of another vehicle ahead of the equipped vehicle utilizing algorithmic decision-making;
wherein said imaging device is part of an interior rearview mirror assembly of the equipped vehicle and wherein processing by said control of said captured image data to detect an oncoming headlight or a leading taillight of another vehicle ahead of the equipped vehicle is performed, at least in part, by circuitry that is part of said interior rearview mirror assembly of the equipped vehicle;
a headlight operable to illuminate at least one of generally forwardly of the equipped vehicle and generally sidewardly of the equipped vehicle;
wherein said headlight comprises a baffle and wherein a forward lighting light beam emanating from said headlight is adjustable via said baffle; and
wherein, responsive to a detection by said control of an oncoming headlight or a leading taillight of another vehicle ahead of the equipped vehicle, said control controls said baffle to adjust said forward lighting light beam in order to reduce light emanating from said headlight glaring a driver of the detected other vehicle ahead of the equipped vehicle.

66. The vehicular vision system of claim 65, wherein said algorithmic decision-making comprises use of an edge detection algorithm.

67. The vehicular vision system of claim 65, wherein said algorithmic decision-making involves at least one of (a) a size of an oncoming headlight or a leading taillight of another vehicle ahead of the equipped vehicle, (b) a shape of an oncoming headlight or a leading taillight of another vehicle ahead of the equipped vehicle, (c) a distance to an oncoming headlight or a leading taillight of another vehicle ahead of the equipped vehicle and (d) a direction toward an oncoming headlight or a leading taillight of another vehicle ahead of the equipped vehicle.

68. The vehicular vision system of claim 65, wherein said vehicular vision system is selectively enabled and disabled in response to an output of at least one of (a) a human-machine interface, (b) a Global Positioning System, (c) a roadside information system, (d) the internet, (e) an intelligent transportation system, (f) a communication system, (g) a telematics system and (h) a navigation system.

* * * * *

UNITED STATES PATENT AND TRADEMARK OFFICE
CERTIFICATE OF CORRECTION

| | | |
|---|---|---|
| PATENT NO. | : 8,814,401 B2 | Page 1 of 1 |
| APPLICATION NO. | : 13/427166 | |
| DATED | : August 26, 2014 | |
| INVENTOR(S) | : Michael J. Higgins-Luthman et al. | |

It is certified that error appears in the above-identified patent and that said Letters Patent is hereby corrected as shown below:

In the Claims

Column 13
Line 36, Claim 38, "(e)" should be --(c)--

Column 18
Line 20, Claim 65, Delete "," after "to"

Signed and Sealed this
Thirtieth Day of June, 2015

Michelle K. Lee
*Director of the United States Patent and Trademark Office*